US008892255B2

(12) United States Patent
Eberst (10) Patent No.: US 8,892,255 B2
(45) Date of Patent: Nov. 18, 2014

(54) METHOD FOR THE AUTOMATED PROGRAMMING AND OPTIMIZATION OF ROBOTIC WORK SEQUENCES

(75) Inventor: Christof Eberst, Munich (DE)

(73) Assignee: Convergent Information Technologies GmbH, Haid (AT)

( * ) Notice: Subject to any disclaimer, the term of this patent is extended or adjusted under 35 U.S.C. 154(b) by 181 days.

(21) Appl. No.: 13/399,494

(22) Filed: Feb. 17, 2012

(65) Prior Publication Data

US 2012/0215352 A1    Aug. 23, 2012

(30) Foreign Application Priority Data

Feb. 17, 2011    (DE) .......................... 10 2011 011 542

(51) Int. Cl.
*G05B 19/18* (2006.01)
*B25J 9/16* (2006.01)
*G05B 19/408* (2006.01)

(52) U.S. Cl.
CPC .............. *B25J 9/1671* (2013.01); *B25J 9/1664* (2013.01); *G05B 2219/40387* (2013.01); *G05B 2219/40394* (2013.01); *G05B 19/4083* (2013.01); *G05B 2219/40512* (2013.01); *G05B 2219/36103* (2013.01); *G05B 2219/36063* (2013.01)
USPC .............. 700/253; 700/29; 700/245; 700/254

(58) Field of Classification Search
CPC .... B25J 9/1671; B25J 9/1664; G05B 19/425; G05B 19/401; G05B 2219/36252
USPC ..................... 700/29, 245, 253, 254
See application file for complete search history.

(56) References Cited

U.S. PATENT DOCUMENTS

| 5,598,076 | A | * | 1/1997 | Neubauer et al. | ......... 318/568.22 |
| 6,076,030 | A | * | 6/2000 | Rowe | ............................... 701/50 |
| 6,157,873 | A | * | 12/2000 | DeCamp et al. | ............... 700/253 |
| 6,167,328 | A | * | 12/2000 | Takaoka et al. | ............... 700/264 |
| 6,321,137 | B1 | * | 11/2001 | De Smet | ....................... 700/245 |
| 6,332,101 | B1 | * | 12/2001 | Kaneko et al. | ................. 700/245 |
| 6,445,964 | B1 | * | 9/2002 | White et al. | ..................... 700/61 |
| 6,463,358 | B1 | * | 10/2002 | Watanabe et al. | .............. 700/253 |
| 7,236,854 | B2 | * | 6/2007 | Pretlove et al. | ............... 700/246 |
| 7,248,012 | B2 | * | 7/2007 | Takahashi et al. | ........ 318/568.13 |

(Continued)

FOREIGN PATENT DOCUMENTS

DE        19859169 A1    6/1999
DE   102004028565 A1    1/2006

(Continued)

*Primary Examiner* — Khoi Tran
*Assistant Examiner* — Jorge Peche
(74) *Attorney, Agent, or Firm* — Laurence A. Greenberg; Werner H. Stemer; Ralph E. Locher (57) ABSTRACT

A method for the automated control of a process robot with a controller performing movement and work sequences and with one or more sensors that record a work progress. A planning tool compares a recorded progress of work with an aimed-for processing objective and determines, from a difference between the processing objective and an actual value of the process that corresponds to the recorded progress of work, movement and work sequences with which the aimed-for processing objective is achieved. Then the determined movement and work sequences are converted into robot-executable control commands in real time or in-step with the process, and the process robot is controlled in such a way as to achieve the aimed-for processing objective.

20 Claims, 5 Drawing Sheets

(56) References Cited

U.S. PATENT DOCUMENTS

| | | | |
|---|---|---|---|
| 7,298,385 B2* | 11/2007 | Kazi et al. | 345/633 |
| 8,412,371 B2* | 4/2013 | Komatsu | 700/166 |
| 2005/0149231 A1* | 7/2005 | Pretlove et al. | 700/264 |
| 2006/0025890 A1* | 2/2006 | Nagatsuka et al. | 700/253 |
| 2006/0255758 A1* | 11/2006 | Takahashi et al. | 318/568.13 |
| 2006/0276934 A1* | 12/2006 | Nihei et al. | 700/245 |
| 2006/0287768 A1* | 12/2006 | Bader et al. | 700/245 |
| 2007/0021868 A1* | 1/2007 | Nagatsuka et al. | 700/245 |
| 2007/0244599 A1* | 10/2007 | Tsai et al. | 700/245 |
| 2008/0035619 A1* | 2/2008 | Hamaguchi et al. | 219/121.79 |
| 2008/0086236 A1* | 4/2008 | Saito et al. | 700/245 |
| 2010/0268353 A1* | 10/2010 | Crisalle et al. | 700/29 |
| 2011/0190932 A1* | 8/2011 | Tsusaka et al. | 700/254 |

FOREIGN PATENT DOCUMENTS

| | | |
|---|---|---|
| EP | 0616706 B1 | 3/1996 |
| JP | H07328964 A | 12/1995 |
| WO | 2009086220 A1 | 7/2009 |

* cited by examiner

METHOD FOR THE AUTOMATED PROGRAMMING AND OPTIMIZATION OF ROBOTIC WORK SEQUENCES

CROSS-REFERENCE TO RELATED APPLICATION

This application claims the priority, under 35 U.S.C. §119, of German application DE 10 2011 011 542.0, filed Feb. 17, 2011; the prior application is herewith incorporated by reference in its entirety.

BACKGROUND OF THE INVENTION

Field of the Invention

The invention relates to a method for the automated programming and optimization of robotic work sequences.

To execute a task, robot controls run programs and control the execution in such a way that the actions (movements, possibly with forces/compliance, signals) always correspond as well as possible, with a high degree of reproducibility, to those programmed. For this purpose, parameterizable actions/movement parameters that can be measured and programmed, such as positions, speeds, forces, are controlled in real time. The control consequently only determines the result indirectly. Only if the relationship between the actions/parameters and the result is sufficiently predictable and reproducible is the result controlled in such a way as to lead to the objective.

To program a task, executable programs are created by means of off-line programming, using "teach-in" or programming by showing. These describe movement commands, actions, signals etc. that can be processed by the control, can be easily measured and controlled and, if exactly followed, are intended to lead to the result that is actually desired (i.e. the objective of the application, of the process).

However, this approach often reaches its limits. To be specific, in the automation of service or maintenance work—on account of outdated material properties, wear, etc., in the production of very small batches—on account of an insufficient number of tests to optimize the process result, in the automation of repair or making-good work in production, in the use of tools that are subject to abrasion, wear or variations (for example abrasive media) or in processes that react very sensitively to parameter changes or are not constant over time (for example painting with a brush/roller).

Such approaches consequently bring about the following effects or problems. The execution of a task by a robot with the same program and parameters does not lead to process results that remain constant but to process results that are clearly different (in terms of quality and progress). The relationship between the result and the action/parameters, and thus the result of the running of a program, cannot be dependably predicted or simulated, progressive control that adapts program parameters to compensate for uncertainties (for example with force/moment control) is also not sufficient, and consequently, for the above cases, sequences that ensure execution while maintaining quality and result cannot be programmed or planned in such a way as to lead to the objective.

The main problem is that robots cannot be controlled and programmed in a result-oriented manner, but are activated by way of commands that merely describe movement, forces, etc. These commands describing various actions can be maintained sufficiently accurately during execution, but may for their part bring about process results that vary or deviate from the objective.

SUMMARY OF THE INVENTION

It is accordingly an object of the invention to provide a method for the automated programming and optimization of robotic work sequences which overcomes the disadvantages of the heretofore-known devices and methods of this general type and which provides for process with which a robot can be programmed and controlled in a manner directed at an objective.

With the foregoing and other objects in view there is provided, in accordance with the invention, a method for the automated control of a process robot with a controller performing movement and work sequences and with at least one sensor recording a work progress, the method which comprises:

comparing, in a planning tool, a recorded work progress with an aimed-for processing objective and determining, from a difference between the processing objective and an actual value of the process that corresponds to the recorded work progress movement and work sequences with which the aimed-for processing objective is achieved;

subsequently converting the determined movement and work sequences into robot-executable control commands in real time or in-step with the process; and controlling the process robot in such a way as to achieve the aimed-for processing objective.

In other words, the robot controller according to the invention controls the process parameters in real time in such a way that a desired processing objective, or machining objective, is achieved. For reasons of compatibility, the robot is usually still activated conventionally. However, not only the execution of the movement and work sequences but also the respective effect of the movement and work sequences are observed and optimized by the extended control. The extended control adapts the planned movement and work sequences in such a way that their prior simulation pre-calculates achievement of the planned processing objective or effect as well as possible and compensates for deviations in the achievement of the objective of preceding actions in subsequent actions. The conventional control signals to the robot are calculated from this. The invention is suitable in particular for applications such as: material-removing machining processes (grinding, polishing, milling, . . . ), application processes (coating, painting, . . . ), generative processes (plasma or metal spraying, build-up welding, . . . ), inspection or cleaning processes, property-changing processes (activation by flame treatment, . . . ) and the like, both in the routine production sequence and when making good (defects) in production or in applications such as repairing or maintaining or overhauling goods or parts or in the applications service sector. All of these processes are referred to herein as "processing," "process progress," "work progress," and the like.

The programming optionally takes place in one or two stages. The planning and simulation of the application optimizes movements of the robot and the process result, but then transfers to an extended robot controller a program not only consisting purely of actions but an extended program that links actions with the objective to be achieved of the respective action. The planning of the same can, in an advantageous implementation, specifically use a variation of the parameters in order to optimize the simulated process result with respect to quality criteria.

The planning tool plans movement sequences of the robot and generates for these movement sequences robot programs that can be executed on a robot controller. At the same time, the planning tool compares the planned effect, i.e. the desired effect to be achieved with the movement sequences, for one or more movement commands or actions with the actual effect measured with a sensor after execution thereof.

The robot usually carries a tool for machining workpieces. Alternatively, however, the robot may also hold the workpiece and move it with respect to a tool. Optionally, the sensors required for measuring the effect actually achieved by a machining operation may be provided on the robot and/or on the tool or in the work cell. The sensors for measuring the effects of the machining as a result of the movement sequences may preferably already evaluate these measurements themselves. For example, the amount or thickness of the layer of the coating removed in a grinding movement is established or the roughness of a surface before and after a grinding operation is determined.

The process simulator serves the purpose of simulating the probable result of a movement sequence. In an advantageous implementation, process forces thereby occurring are also calculated. The process model always calculates the effects measured by the sensors (actual values) with the results simulated for the executed movements and actions recorded by the control, and adapts the parameters of the process model in such a way that the calculated effect matches the measured effect increasingly well. This allows, for example, possible tool or robot wear or changed material properties of the workpiece or ambient parameters (air/workpiece temperature, moisture, etc. . . . ) to be taken into consideration.

A result-oriented activation of the robot or of the machining tool is essential for the invention. In particular, the aimed-for target effect and the aimed-for processing objective are taken into consideration in the robot controls by measuring, controlling and optimizing the machining progress in real time or in step with the machining process.

And this takes place directly on the basis of the desired, aimed-for processing objective instead of, as in the case of conventional control, by prescribing movements and parameters that merely achieve an often not exactly known or changeable effect, and consequently contribution to the result. This becomes possible by using process models and a real-time process simulation, the process model of which can be continually adapted in dependence on the sensor data, that is the measured progress of the process.

In this way, abrasion of the tool over time can be taken into consideration in just the same way as material properties that are initially unknown or that change over time or properties in the interaction between the tool and the workpiece surface. The adaptation takes place, for example, by a comparison of the simulation of the process result for the actually executed path, measured by a sensor, and the direct measurement of the process result before/after execution of a machining operation. Apart from achieving the processing objective, the aim is also to minimize the deviation between the simulation and the measurement by modification of the process model.

Other features which are considered as characteristic for the invention are set forth in the appended claims.

Although the invention is illustrated and described herein as embodied in method for the automated programming and optimization of robotic work sequences, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
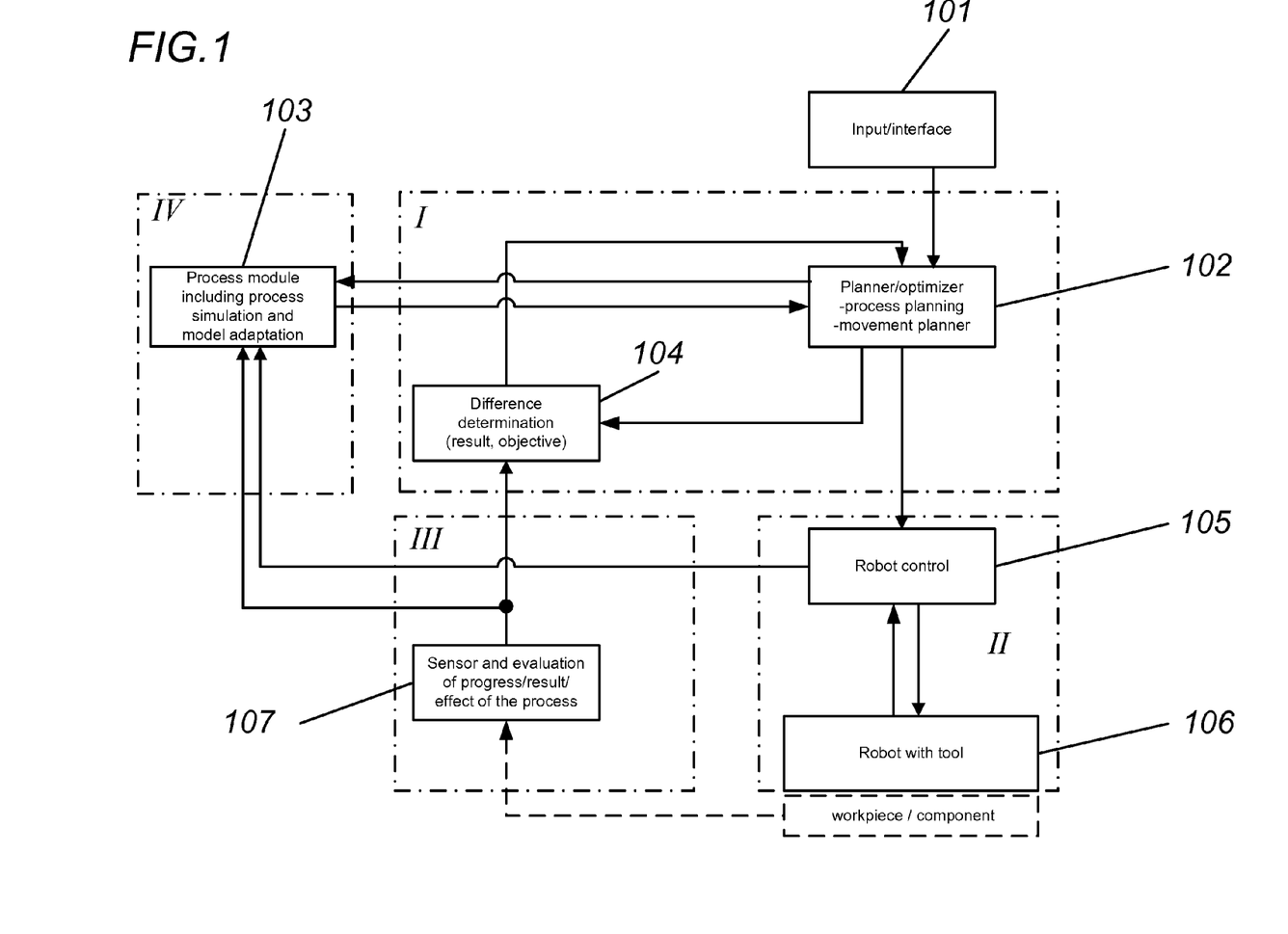
FIG. 1 shows a diagram illustrating the method according to the invention, with a tool, a robot control, a sensor unit and a process simulator.

Referring now to the figures of the drawing in detail, a planning tool is denoted by I, a robot controller by II, a sensor unit by III, and a process simulator by IV. An external input is effected via the input interface 101. Via this interface, target values, CAD data or the like can be transferred into the planning tool I. The planning tool I calculates and optimizes movement sequences of a robot in dependence on an effect that is planned and to be achieved. This planning tool I can plan the process and the paths required for it and locally adapt movement paths and parameters, such as speed, pressing pressure and the like, in order to compensate for previous deviations in the effect (104), established by sensors, and amend the execution of future paths in such a way that the effect simulated for the adapted paths is changed in such a way that the deviation from the previously planned effect is minimized on a specific or overall level. The corresponding process calculations take place in the process planning or in the movement planner 102.

The invention includes a process simulator with a process model 103 for the pre-calculation of a process result to be achieved for a planned movement sequence. The process model parameters are adaptable in an automated manner in such a way that the simulation results for the previously executed movements and actions (logged in the controller 105) come as close as possible to the actual process results measured by sensors. A controller 105 takes over in the usual way the sequence control and the execution of the program for representing the respectively desired path of movement to be executed with a robot 106. The robot is activated by the robot controller 105 to achieve a desired path of movement, which paths of movement are preferably also logged. In addition, the forces occurring during the individual movements may possibly be logged. To be able to measure the machining progress, a sensor 107 is provided, which sensor directly measures the effect of the machining as a result of the movement sequences and possibly already evaluates it. For example, the amount or thickness of the coating removed in a grinding movement is established or the roughness of a surface before and after a grinding operation is determined. The difference determination 104 compares the actual values of the effect pre-calculated by the process simulation and recorded by the sensor 107 and passes them on to the process planning 102.

Planned process paths are transferred with parameters, movement paths for relative movements between the workpiece and the tool, from the process planning 102 to the process simulation 103, which for its part returns simulated process results for the movement paths to the process planning 102. Executable commands or a program as a whole or in parts is/are transferred from the process planning 102 to the robot controller 105. The process result expected for these commands or program (parts) transferred to 105 is also passed on by the process planning 102 to the difference determination 104. The robot controller 105 controls the robot or the tool 106 in dependence on the robot commands on the pre-calculated movement paths. The robot returns the actually traveled movement paths to the control, which logs them. These values are likewise returned by the robot controller to the process simulation 103. The actual effect measured by the sensors after the machining is sent on the one hand to the process simulation 103 and on the other hand to the difference determination 104.

Figure 2:
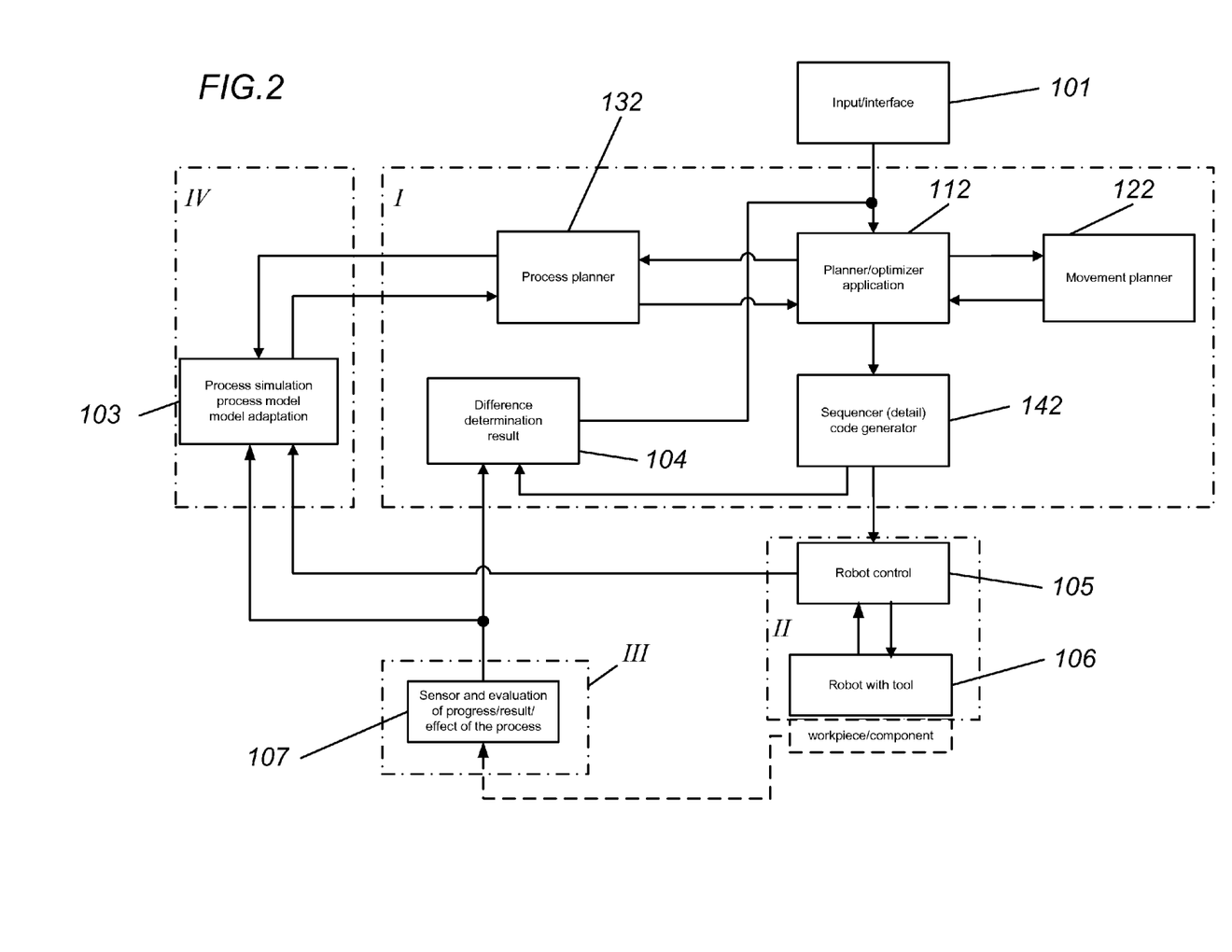
FIG. 2 shows the diagram from FIG. 1 with a more detailed planning tool.

Referring now to FIG. 2, there is shown a single-stage execution of a planning tool capable of online operation by way of example. There, the application for planning or optimization 112 alternately calls up the process planner 132 and the movement planner 122, in order to find a robot movement suitable for a respective required tool path with which a desired effect is intended to be achieved. The planning generates an initial plan for the prescribed objective and, subsequent to that, plan adaptations to take into consideration deviations established (in 104) between the calculated effect and the effect actually measured. The process planner 132 thereby plans and optimizes tool paths in such a way that the process result simulated for the paths satisfies prescribed criteria. For this purpose, the process planning 132 calls up the process simulation 103. The movement planner 122 checks tool paths planned by the process planning 112 for feasibility and possibly adapts them. Optimized movement paths are returned to the planning/optimization 112. Movement paths that are not feasible are rejected. The code generator 142 generates a program that can be executed by the robot control and transfers it or parts thereof to the robot controller 105. Moreover, the pre-calculated effect is transferred to the difference determination 104, which, subsequent to that, evaluates deviations between the pre-calculated effect and the actual effect recorded by the sensors.

Figure 3:
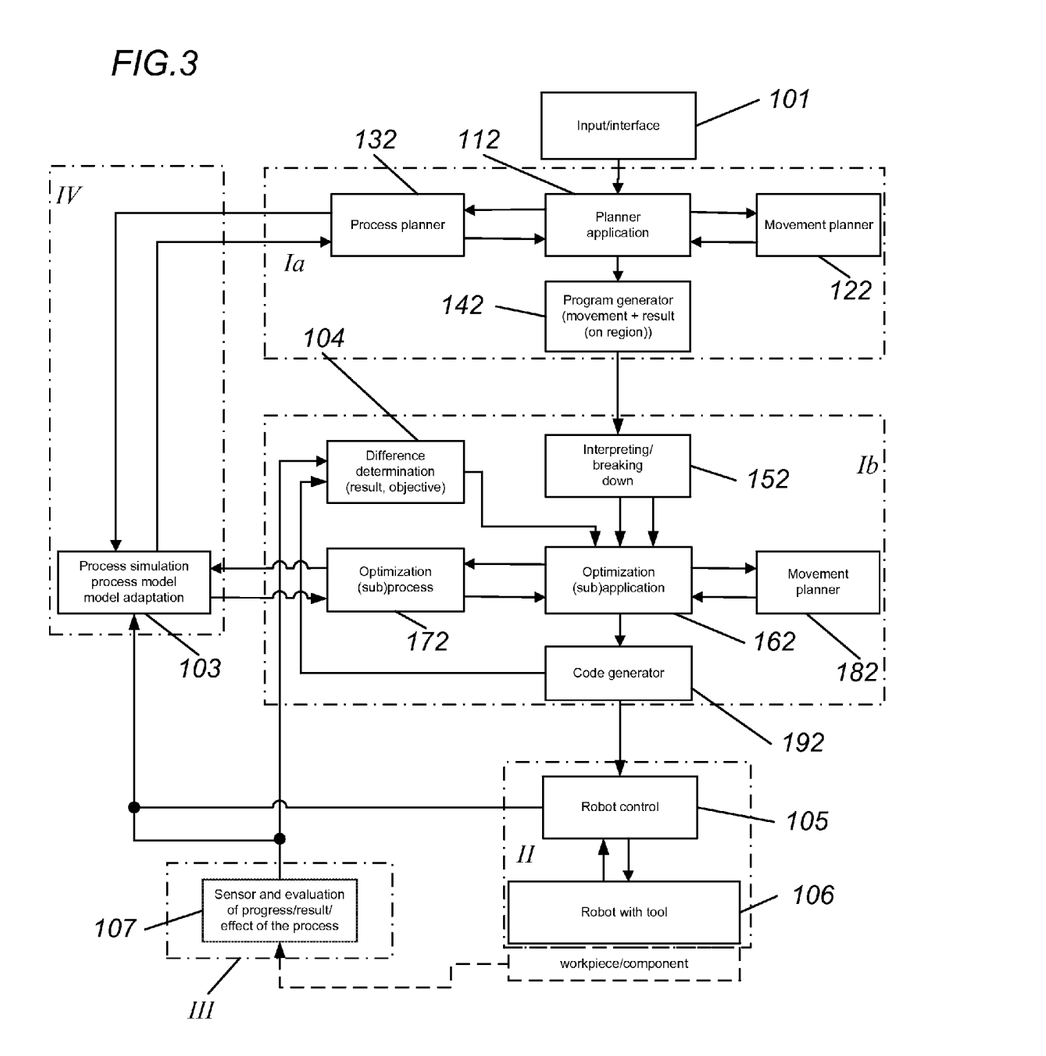
FIG. 3 shows a two-stage planning tool for off-line planning and online adaptation.

Referring now to FIG. 3, there is shown the two-stage execution of the planning, subdivided into modules capable of off-line operation and capable of online operation, by way of example. The module for planning 112 an application once again alternately calls up a process planner 132 and a movement planner 122, in order to find a robot movement suitable for a respective required tool path with which a desired effect is intended to be achieved. The planning generates an initial movement plan for the prescribed objective. The process planner 132 plans and optimizes tool paths in such a way that the process result simulated for the paths satisfies prescribed criteria. For this purpose, the process planner 132 calls up the process simulation 103. The movement planner 122 checks the tool paths planned by the process planning 132 for feasibility and possibly adapts them. Optimized movement paths are returned, whereas movement paths that are not feasible are rejected. The program generator 142 generates a plan which combines: firstly a program that can in principle be executed by the robot and secondly a description of the effects that can be achieved with the program and the individual movements and actions thereof—the description in an ideal embodiment supporting a simple reciprocal assignment of effect(s) and action(s) or movements. 142 passes this plan on to a module for separating or breaking down 152 the plans found in the planning tool Ia.

In further steps, movement plan adaptations are made to take into consideration established deviations between a calculated effect and an actual measured effect in the planning tool Ib.

In this exemplary embodiment, the module for difference determination 104 is assigned to the planning tool Ib. The optimization application 162 carries out an adaptation of process and movement plans to an objective to be achieved in real time or in step and generates for the objective or for a sub-objective objective corrections and adapted plans. These are adapted by a process optimization 172 with the assistance of the process simulated for the respective path in such a way that, in spite of possibly occurring deviations in the result of the previous actions, the difference between the planned result taken over off-line in 152 and the result simulated for the paths adapted online, overall or for the next paths of the plan, is minimal. The movement planner 182 checks in turn for feasibility and freedom from collisions of the individual movement paths. Movement paths found and deemed good with an assigned effect are in turn translated by a generator 192 separately into, firstly, commands that can be executed by the robot, which are transferred to the controller 105, and, secondly, the pre-calculated effects, which are transferred to the difference determination 104.

Figure 4:
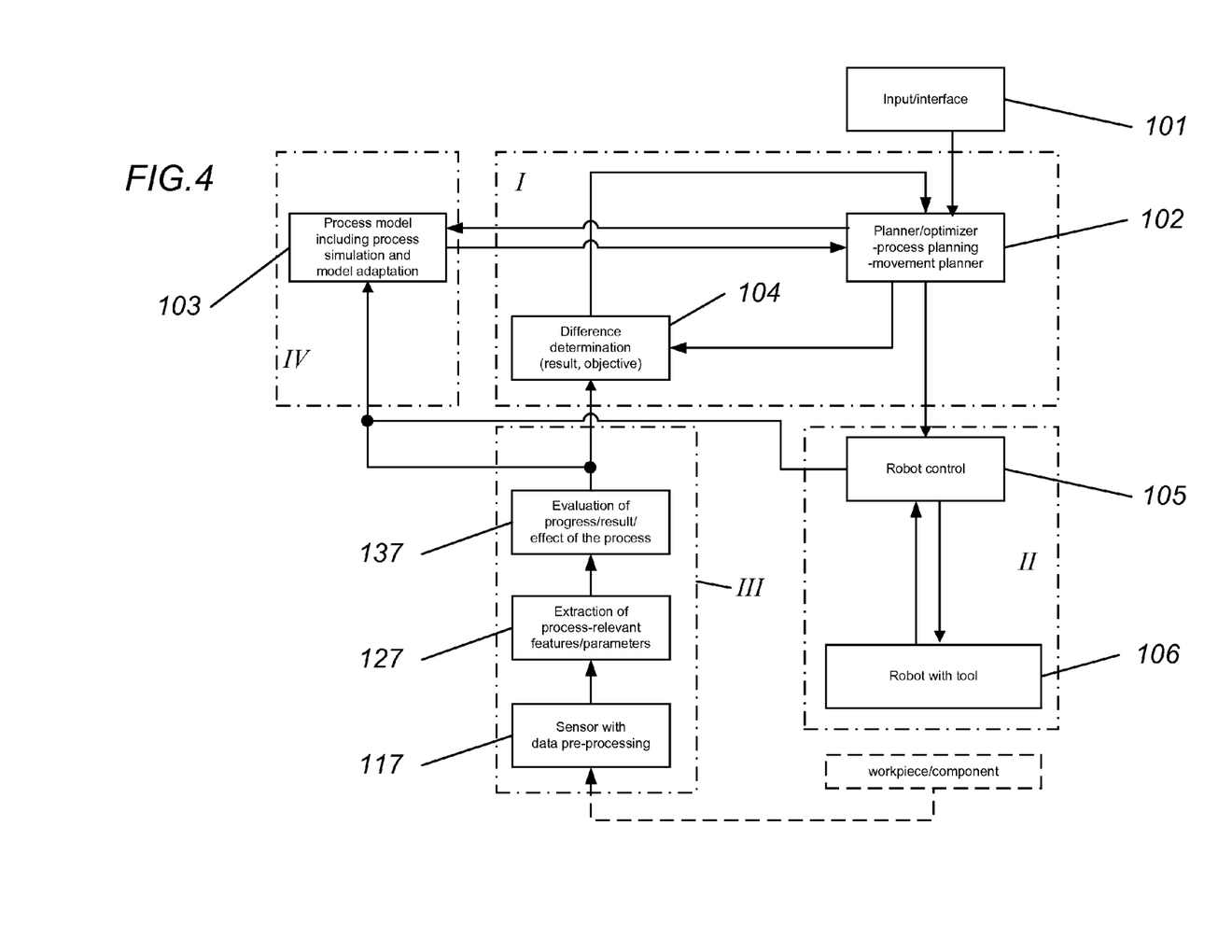
FIG. 4 shows a more detailed representation of the sensor module.

According to FIG. 4, the sensor unit 3 comprises a sensor with data processing 117, with which, for example, 3D data, in particular point clouds of a surface or the like, can already be captured and pre-processed. These data are then passed to a module for the extraction of process-relevant features and parameters 127, which, for example, filters out and discards data not required or analyzes sensor data with a mathematical model, and consequently, for example, transforms 3D point measurements into shape, curvature or surface descriptions. A module for evaluating the progress or result of the process or the effect of the process 137 then definitively determines the process-relevant data, for example the thickness of the layer applied or removed at various points of the workpiece, which represent the measured actual value that is transferred to the difference determination 104 and to the process simulation model 103 for further processing.

Figure 5:
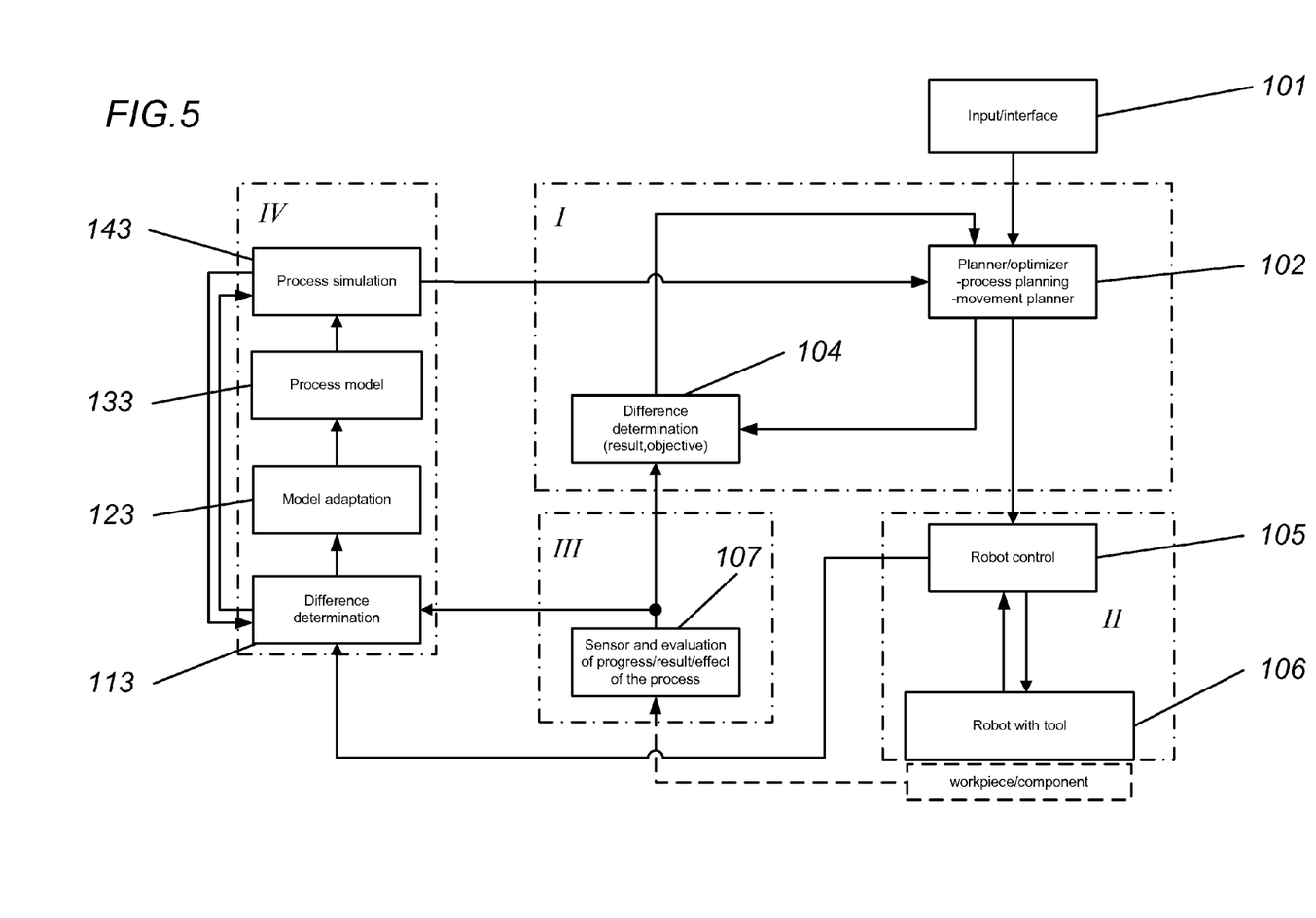
FIG. 5 shows a more detailed representation of the process simulator.

According to FIG. 5, the process simulation IV comprises a module for difference determination 113, with which a comparison of the measured progress or result of a process with the progress or result of a process simulated for the movement actually executed and recorded by the control is performed by calculating the difference or deviation. This deviation is used by the model adaptation 123 for adapting the model of the process in such a way as to minimize the deviation between the progress of the process measured in 107 and the progress of the process simulated for the actually recorded movement/action.

For this purpose, the process model 133 is adapted by the model adaptation 123 until the process simulation 143 provides an adapted, sufficiently good result, which deviates from the actual measurement result only by a desired small tolerance. If required, the points 113, 123, 133 and 143 for the optimization are run through cyclically, in order to minimize the difference error between simulation and measurement.

The invention claimed is:

1. A method for the automated control of a process robot with a controller performing movement and work sequences and with at least one sensor recording a work progress carried out on a workpiece, the method which comprises:
   comparing, in a planning tool, a recorded work progress carried out on the workpiece with an aimed-for processing objective for the workpiece and determining, from a difference between the processing objective and an actual value of the process that corresponds to the recorded work progress movement and work sequences with which the aimed-for processing objective for the workpiece is achieved;

subsequently converting the determined movement and work sequences into robot-executable control commands in real time or in-step with the process; and controlling the process robot in such a way as to achieve the aimed-for processing objective.

2. The method according to claim 1, which comprises pre-calculating with a process simulator achievement of the planned processing objective and compensating for deviations in the achievement of the objective of previous movement and work sequences in the planned movement and work sequences to be executed by adaptation of the process parameters or movements, and executing planned movement and work sequences to be executed with the controller only after successful simulation thereof in the process simulator.

3. The method according to claim 1, wherein the controller optimizes movement and work sequences, and wherein a simulated processing result of the movement/sequence is compared with a processing objective as the quality criterion.

4. The method according to claim 1, which comprises generating, with the planning tool, sequence/movement programs and also pre-calculating the effect thereof as a whole or for grouped-together or individual movements and actions or sub-portions thereof.

5. The method according to claim 4, which comprises generating with the planning tool a description of the application, the description including sequence/movement programs and a simulated effect and assigning for complete sequence/movement programs and/or parts thereof a simulated effect thereof.

6. The method according to claim 5, wherein the simulated effect and the complete or partial sequence/movement programs is assigned reciprocally.

7. The method according to claim 5, which comprises executing the description of the application on a controller and measuring or deriving the part describing the effect directly or indirectly by way of one or more sensors.

8. The method according to claim 5, which comprises assigning the description of the effect or of the result to individual regions of the workpiece that is processed.

9. A method for the automated control of a process robot with a controller performing movement and work sequences and with at least one sensor recording a work progress, the method which comprises:

comparing, in a planning tool, a recorded work progress with an aimed-for processing objective and determining, from a difference between the processing objective and an actual value of the process that corresponds to the recorded work progress movement and work sequences with which the aimed-for processing objective is achieved;

subsequently converting the determined movement and work sequences into robot-executable control commands in real time or in-step with the process; and controlling the process robot in such a way as to achieve the aimed-for processing objective;

the planning tool being assigned a process simulator, and which comprises calculating with the process simulator on the basis of a respective measured actual value of the processing progress the effect of planned subsequent movement and work sequences and comparing a calculated effect with a recorded, actual value.

10. The method according to claim 9, which comprises performing the comparing step by comparing the calculated effect with the actual value after the movement and work sequence has taken place.

11. The method according to claim 9, which comprises, in order to improve a computing model of the process simulator, readjusting process simulator parameters in such a way as to make the calculated effect match the actual effect.

12. The method according to claim 11, which comprises logging the values of the individual relevant process simulator parameters over time and calculating prognoses of a tool or process-medium service life, abrasion and effectiveness or of required maintenance work or parameter adaptations to compensate for the abrasion or changed effectiveness based on the logged data.

13. The method according to claim 1, wherein the planning tool is assigned a process simulator, and which comprises calculating with the process simulator an expected effect of movement and work sequences already executed, and optionally logged by the controller, and comparing the movement and work sequences with a measured actual value of these executed movement and work sequences.

14. The method according to claim 13, which comprises, in order to improve a computing model of the process simulator, readjusting process simulator parameters in such a way as to make the calculated effect match the actual effect.

15. The method according to claim 14, which comprises logging the values of the individual relevant process simulator parameters over time and calculating prognoses of a tool or process-medium service life, abrasion and effectiveness or of required maintenance work or parameter adaptations to compensate for the abrasion or changed effectiveness based on the logged data.

16. The method according to claim 1, which comprises measuring and optionally evaluating, with at least one sensor assigned to the robot or a robot tool, actual values of the processing operation.

17. The method according to claim 16, which comprises measuring with the at least one sensor actual values of the processing operation for measuring the actual effect achieved with a processing operation as a result of the movement and work sequences.

18. The method according to claim 1, which comprises, for applications with an unknown or very uncertain interaction between a tool and the workpiece:

initially, prior to adjusting process simulator parameters, planning defensively with the planning tool by, firstly, during first carried-out actions of an application, newly establishing or adjusting the process simulator parameters or a simulation model; and secondly, during the adjustment phase, simulating first actions of an application and planning with process simulator parameters that correspond to a maximum possible effect.

19. The method according to claim 18, which comprises planning, with the planning tool, an action to be repeatedly carried out in order to achieve the processing objective.

20. A method for the automated control of a process robot with a controller performing movement and work sequences and with at least one sensor recording a work progress, the method which comprises:

comparing, in a planning tool, a recorded work progress with an aimed-for processing objective and determining, from a difference between the processing objective and an actual value of the process that corresponds to the recorded work progress, movement and work sequences with which the aimed-for processing objective is achieved;

subsequently converting the determined movement and work sequences into robot-executable control commands in real time or in-step with the process;

controlling the process robot in such a way as to achieve the aimed-for processing objective;

calculating with a process simulator process forces occurring during the movement and work sequences and continually coordinating pre-calculated process forces with process forces recorded by respective sensors.

\* \* \* \* \*